3,083,192
POLYOLEFIN PURIFICATION WITH DIETHYLENE GLYCOL MONOBUTYL ETHER

James M. Davison, Charleston, and William W. McGaughy, South Charleston, W. Va., assignors to Union Carbide Corporation, a corporation of New York
No Drawing. Filed Nov. 27, 1956, Ser. No. 624,512
2 Claims. (Cl. 260—93.7)

This invention relates to a method for the removal of organo-metallic catalyst from polyolefin resins.

Olefins may be polymerized at low pressures in the presence of catalyst mixtures containing organo-metallic compounds to produce high molecular weight normally solid resins. The polymerization is generally conducted at ethylene pressures up to about 50 atmospheres in the presence of a catalyst mixture such as an aluminum trialkyl and a halide of a metal of group IVB, VB, or VIB of the periodic system of the elements. The polymerization is generally carried out under anhydrous conditions in the presence of an inert hydrocarbon diluent such as, for example, toluene, xylene, hexane, heptane, or purified kerosene and the polymers produced contain appreciable amounts of occluded catalyst. The presence of these catalyst residues is undesirable as it deleteriously affects the physical and electrical properties of the polymer.

Polyolefin resins produced with organo-metallic catalysts may be purified by washing with large quantities of organic liquids such as methanol, isopropanol, and butanol; or by filtration of a hot resin-diluent solution to remove the suspended polymerization catalyst. Purification by washing with organic liquids requires the use of large volumes of solvent to reduce the catalyst residue content of the resin to a desirable low level. In addition, the mixing of the wash liquid with the organic polymerization diluent requires a costly separation before the polymerization diluent and the wash liquid can be recovered for re-use.

Filtration requires that the catalyst residues be present in an insoluble easily filterable form and that the resin itself be in solution. If the resin has been produced in an organic liquid in which the resin is not completely soluble at the polymerization temperature employed the entire mass must then be heated to a temperature at which the resin is completely dissolved in the organic liquid before the catalyst residues can be filtered off. Filtration also usually requires the use of a filter-aid to effect efficient removal of catalyst and to obtain satisfactory filtration rates. Even with the use of a filter-aid, plugging of filters at intervals is still encountered.

In accordance with this invention, organo-metallic catalysts and catalyst residues are removed from polyolefinic resins by mixing the resin, either in the form of solid fine particles in a hydrocarbon diluent or as a solution of resin in the diluent, with substantially stoichiometric quantities, based on the catalyst present, of a water-soluble alcohol which is also soluble to some extent in the organic diluent to thereby convert the catalyst to a water-soluble complex. The resin diluent water-soluble catalyst complex mixture is then washed with water to remove the solubilized catalyst residues and any unreacted alcohol. By this means up to about 99.5% of ash-forming metal-atom containing catalyst impurities can be removed from the resin. The process of this invention is applicable to polyolefin resins containing from about 0.05% to about 10% by weight, or more based on the weight of the resin of ash-forming metallic catalyst impurities.

More particularly the method of this invention comprises adding a substantially anhydrous water-soluble alcohol to a mixture comprising polyolefin resin, inert water-insoluble organic diluent, and catalyst mixture comprising an aluminum trialkyl and a halide of a metal of group IVB, VB or VIB of the periodic system, agitating the mixture, either as a solution of the resin in the diluent or as a slurry of resin particles in the inert organic diluent, the alcohol reacting with the catalyst mixture to produce water-soluble complexes, and then washing the entire reaction mixture with water to remove the produced water-soluble complexes and any unreacted alcohol from the mixture. For example, when the polymerization of an olefin, such as ethylene, propylene or the like, is carried out with the aid of a catalyst complex consisting of a mixture of triisobutyl aluminum and titanium tetrachloride dispersed in a hydrocarbon diluent the catalyst residues can be converted to water-soluble compounds or complexes after the polymerization is completed by the addition of a water-soluble alcohol such as diethylene glycol monobutyl ether to the polymerization mixture. Other than the observation that water-soluble products or complexes are formed the chemical composition of the water-soluble compounds or complexes formed by the reaction of a water-soluble alcohol with the catalyst mixture has not as yet been established. These compounds may be readily washed out with water together with any excess unreacted water-soluble alcohol present. Among the resins which can be purified by the method of this invention are those resins obtained by polymerizing ethylene, propylene, 4-methyl-1-pentene or copolymers thereof.

The water-soluble alcohol can be added to the anhydrous resin diluent catalyst mixture at a temperature of from about 20 °C. to about 150° C. and under suitable pressure when such temperatures exceed the normal boiling point of the alcohol or the diluent. Anhydrous conditions are maintained until after the water-soluble alcohol has been added and the catalyst mixture has essentially completely reacted with it. This reaction between catalyst complex and water-soluble alcohol can be accelerated by heating the mixture so as to dissolve the resin in the diluent and thus free catalyst particles which may be occluded in the resin. Temperatures of from about 100° C. to about 150° C. are preferred for dissolving the resin in the diluent but the process is equally adaptable to resin slurries at temperatures below 100° C. or to solutions at temperatures above 150° C.

Among the water-soluble alcohols suitable for use in this invention are the aliphatic monohydric alcohols such as methanol, ethanol, propanol, isopropanol, or butanol; the aliphatic polyhydric alcohols such as ethylene glycol, propylene glycol and glycerine; and the aliphatic ether alcohols such as the monomethyl-, monoethyl-, and monobutyl-ethers of ethylene glycol or of diethylene glycol, or of triethylene glycol. The term water-soluble is intended to apply to alcohols having a solubility in water of at least 5 parts per 100 parts of water.

The amount of water-soluble alcohol added to the polyolefin diluent catalyst mixture may vary from about 0.5 to about 1.5 molar equivalents of water-soluble alcohol per molar equivalent of catalyst present in the mixture. Thus one mole of a trivalent organo-metallic catalyst compound may have from about 1.5 to about 4.5 moles of a water-soluble alcohol added thereto.

In most cases a stoichiometric amount of water-soluble alcohol is all that is required. However, in practice, about 75 to 85% of the theoretical stoichiometric amount has proven adequate to remove up to about 99.5% of the ash-forming metal-atom-containing catalyst impurities. Thus to form a water-soluble complex from one pound of triisobutylaluminum (M.W. 198.3) present in the polymerization catalyst mixture there is required from about 0.35 to 0.5 pound of methanol, or from about 2 to about 2.5 pounds of diethylene glycol monobutyl ether.

The polyolefin resins used in this invention were produced in an autoclave by bubbling the olefin as a gas through an organic hydrocarbon diluent such as hexane or heptane. The polymerizations were catalyzed by the conjoint addition of catalyst, such as a mixture of triisobutylaluminum and titanium tetrachloride, while the reaction was being stirred at temperatures of from about 50° C. to about 150° C. The polymer produced was then purified as described in the following examples, which further serve to illustrate this invention.

Example I

Polyethylene was produced by bubbling ethylene gas into heptane contained in an autoclave. Simultaneously, a polymerization catalyst composition comprising triisobutylaluminum and titanium tetrachloride, was fed into the autoclave. The reaction was carried out at about 140° C. under a pressure of about 90 p.s.i.g. The solution was cooled to about 60° C. to precipitate the resin and about 208 pounds of a slurry of finely divided polyethylene in heptane was obtained from the reactor and charged to an autoclave which was equipped with an agitator. The slurry consisted of about 22.5 pounds of resin, about 2.5 pounds of catalyst consisting of a mixture of titanium tetrachloride (0.0063 mole) and triisobutylaluminum (0.0063 mole) and about 183 pounds of heptane. Heptane was added to dilute the slurry to a solids content of about 7 percent by weight. Six pounds of diethylene glycol monobutyl ether (0.037 mole) were added and stirred into the slurry. The autoclave was closed, steam was put on the jacket, and the contents heated to about 140° C. to form a solution of the resin in the diluent, and stirred for about one-half hour. Ten gallons of water were pumped into the autoclave, the aqueous mixture was agitated for about one-half hour at about 140° C. and the water layer containing solubilized catalyst residues and salts was drained off. At sample of the polymer-heptane solution was cooled to precipitate the resin from the heptane and the resin was filtered from the diluent and dried. The dry resin sample had an ash content of 3.7 weight percent, determined as metallic oxides. A second ten-gallon water wash was added and agitated as before at about 140° C. and drained off. A sample of this polymer solution was taken after the second hot water wash and cooled to precipitate the resin from the heptane. The resin was filtered and dried in the same manner as the previous sample. This resin sample had an ash content of 0.15 weight percent, determined as metallic oxides. The polyethyleneheptane solution was cooled to 60° C. to precipitate the resin, and the resulting resin-heptane slurry was washed twice at about 25° C. with about 20 gallons of water each time. The resin was separated from the heptane diluent by centrifugation and dried. The ash content of the dried resin was 0.03 weight percent, determined as metallic oxides.

Example II

A. About 500 gallons of a slurry of polyethylene resin in heptane produced as described in Example I were obtained from a reactor after polymerization, and charged to a tank equipped with an agitator. The resin slurry contained about 343 pounds of resin and about 37 pounds of catalyst complex consisting of a mixture of triisobutyl aluminum (0.095 mole) and titanium tetrachloride (0.095 mole). One hundred pounds of diethylene glycol monobutyl ether (0.61 mole) were added to the slurry and the mixture was stirred at room temperature for about 1 hour. Added about 400 gallons of water to the mixture, stirred about 1 hour and drained off the water layer. The slurry was washed another two times with 400 gallon portions of water. A sample of the polyethylene slurry was filtered and the resin was dried. The dry resin had an ash content of 0.8 weight percent, determined as metallic oxides.

B. To illustrate the advantage of working at higher temperatures about 200 pounds of the above water-washed resin slurry, which contained about 25 pounds of polyethylene was transferred to an autoclave. Heptane was added to dilute the slurry to a solids content of about 7 percent by weight. Six pounds of diethylene glycol monobutyl ether (0.037 mole) were added and mixed into the resin slurry by agitation and the autoclave was closed and the contents stirred about 40 minutes while heating to 140° C. Ten gallons of water were pumped into the autoclave, the mixture was agitated for about one-half hour at 140° C. and the water layer containing the solubilized catalyst residues and salts was drained off. The resin-diluent solution was water-washed once again at 140° C. and then the resin-heptane solution was cooled to about 60° C. to precipitate the polymer. The resulting slurry was washed twice with about 20 gallon portions of water each time. The polyethylene was separated from the heptane by centrifugation and dried. The dry resin had an ash content of 0.01 weight percent, determined as metallic oxides.

Example III

Polypropylene resin was produced by bubbling propylene at a reaction temperature of from about 117° C. to about 127° C. and a pressure of about 90 p.s.i.g. into a mixture of about 2400 pounds of heptane and about 6.6 pounds (about 0.034 mole) catalyst complex, comprising a trialkyl aluminum compound and titanium trichloride. The reaction mixture was a dark brown, almost black, solution of polymer in diluent. Immediately after polymerization, added 25 pounds of diethylene glycol monobutyl ether (0.154 mole) to the polymer solution, which now contained about 176 pounds of crude polymer, about 2400 pounds of heptane, and about 6.6 pounds of catalyst, or 3.75% catalyst based on the weight of resin present. The mixture was stirred at 130° C. for about one-half hour following the addition of the diethylene glycol monobutyl ether. Pumped about 50 gallons of water into the autoclave and agitated the mixture for one-half hour at 130° C. The water layer containing the solubilized catalyst residues and salts was drained off. The water wash was repeated once again, and then the polypropylene solution was cooled to precipitate the polymer. The resin-heptane slurry was washed twice at room temperature with 200 gallons of water each time. The washed slurry was centrifuged to separate the resin from the heptane and the resin was dried. A sample had an ash content of 0.06 weight percent, determined as metallic oxides.

Example IV

Polypropylene was produced by bubbling propylene gas at about 130° C. and a pressure of about 100 p.s.i.g. into a mixture of about 47 pounds of heptane containing about 0.264 pound of a catalyst complex, comprising a trialkyl aluminum compound and titanium trichloride. There was produced 4.2 pounds of polymer which was diluted to a solids content of about 2.5 percent by weight by the addition of another 120 pounds of heptane. The catalyst present amounted to about 6.3 percent based on the weight of polymer present. One pound of isopropanol (0.017 mole) was added to the resin-diluent solution and agitated at about 130° C. for one-half hour. Fifteen gallons of water were pumped into the autoclave, the mixture was stirred for one-half hour at 130° C. and then the water containing the solubilized catalyst residues and salts was drained off. The water wash at 130° C. was repeated and the heptane-polypropylene mixture was then cooled to about 25° C. to precipitate the resin. The slurry was washed twice at room temperature with 20 gallon portions of water and the resin was centrifuged off and dried. The dry resin had an ash content of about 0.11 weight percent, determined as metallic oxides.

Example V

Polyethylene was produced by continuously feeding ethylene gas, heptane and a catalyst composition comprising a mixture of triisobutyl aluminum and diisobutyl aluminum chloride (50 percent by weight of each) and titanium tetrachloride to an autoclave at a reaction temperature of 50° C. and a pressure of 24 p.s.i. Continuous withdrawal of reaction mixture was made at such a rate that a substantially constant volume of 300 gallons was maintained in the autoclave. Resin was produced at the rate of about 35 pounds per hour; and the average solids content in the resin-diluent slurry was about 4 percent by weight. A portion of the slurry was filtered and the dried resin had an ash content of 0.47 weight percent, determined as metallic oxides. A 260 pound portion of this slurry was charged to an autoclave, one pound of ethylene glycol (0.016 mole) was added and the mixture was stirred at 130° C. for about one-half hour. Fifteen gallons of water were pumped into the resin solution and the mixture was stirred at 130° C. for one-half hour. The water layer containing the solubilized catalyst residues and salts was drained off. The wash was repeated and then the mixture was cooled to room temperature to precipitate the resin. Washed the resin-diluent slurry twice with 20 gallon portions of water at room temperature and then the resin was centrifuged off and dried. The dry resin had an ash content of about 0.13 weight percent, determined as metallic oxides.

What is claimed is:

1. Method for removing from polyethylene the ash-forming metal-atom containing catalyst residues of a catalyst mixture consisting of a lower alkyl aluminum compound with a halide of a metal selected from the group of metals of groups IVB, VB, and VIB of the periodic system of the elements which are reactive with alcohols to form water-soluble compounds, which comprises the steps of adding a substantially stoichiometric quantity, based on the amount of catalyst present, of diethylene glycol monobutyl ether to a mixture comprising said polyolefin resin, inert hydrocarbon diluent and said catalyst mixture and reacting the mixture with the diethylene glycol monobutyl ether to form said water-soluble compounds, adding water to form an aqueous solution of said soluble compounds, separating the water layer, which contains the solubilized catalyst residues, from the resin-diluent layer, and washing the resin diluent layer with water.

2. Method for removing from polypropylene the ash-forming metal-atom containing catalyst residues of a catalyst mixture consisting of a lower alkyl aluminum compound with a halide of a metal selected from the group of metals of groups IVB, VB, and VIB of the periodic system of the elements which are reactive with alcohols to form water-soluble compounds, which comprises the steps of adding a substantially stoichiometric quantity, based on the amount of catalyst present, of diethylene glycol monobutyl ether to a mixture comprising said polyolefin resin, inert hydrocarbon diluent and said catalyst mixture and reacting the mixture with the diethylene glycol monobutyl ether to form said water-soluble compounds, adding water to form an aqueous solution of said soluble compounds, separating the water layer, which contains the solubilized catalyst residues, from the resin-diluent layer, and washing the resin diluent layer with water.

References Cited in the file of this patent

UNITED STATES PATENTS

| | | |
|---|---|---|
| 2,683,139 | Leary et al. | July 6, 1954 |
| 2,813,136 | Mertz | Nov. 12, 1957 |
| 2,833,755 | Coover | May 6, 1958 |
| 2,874,153 | Bowman et al. | Feb. 17, 1959 |
| 2,886,561 | Reynolds et al. | May 12, 1959 |
| 2,898,329 | Kittleson | Aug. 4, 1959 |
| 2,904,542 | Fasce et al. | Sept. 15, 1959 |
| 2,905,659 | Miller | Sept. 22, 1959 |
| 2,953,554 | Miller | Sept. 20, 1960 |
| 2,962,488 | Horne | Nov. 29, 1960 |

FOREIGN PATENTS

| | | |
|---|---|---|
| 533,362 | Belgium | May 16, 1955 |
| 544,418 | Belgium | May 1, 1956 |